United States Patent
Cave et al.

(10) Patent No.: US 7,406,044 B2
(45) Date of Patent: Jul. 29, 2008

(54) METHOD FOR PROVIDING FAST FEEDBACK INFORMATION FOR RANDOM ACCESS CHANNEL IN A WIRELESS COMMUNICATION SYSTEM

(75) Inventors: Christopher Cave, Candiac (CA); Marian Rudolf, Montreal (CA)

(73) Assignee: Interdigital Technology Corporation, Wilmington, DE (US)

( * ) Notice: Subject to any disclaimer, the term of this patent is extended or adjusted under 35 U.S.C. 154(b) by 768 days.

(21) Appl. No.: 10/672,179

(22) Filed: Sep. 26, 2003

(65) Prior Publication Data

US 2004/0116126 A1  Jun. 17, 2004

Related U.S. Application Data

(60) Provisional application No. 60/413,952, filed on Sep. 26, 2002.

(51) Int. Cl.
*H04J 1/16* (2006.01)
*H04J 3/14* (2006.01)

(52) U.S. Cl. .......... 370/230.1; 370/231; 370/278; 370/329; 370/342; 455/561

(58) Field of Classification Search .......... 370/230.1, 370/231, 232, 233, 278, 329, 342, 345, 462; 455/561
See application file for complete search history.

(56) References Cited

U.S. PATENT DOCUMENTS

| | | | |
|---|---|---|---|
| 5,166,929 A | 11/1992 | Lo | |
| 5,276,911 A | 1/1994 | Levine et al. | |
| 5,956,644 A * | 9/1999 | Miller et al. | 455/453 |
| 6,088,344 A | 7/2000 | Wales et al. | |
| 6,128,504 A | 10/2000 | Ciccone | |
| 6,577,618 B2 | 6/2003 | Diachina et al. | |
| 6,965,633 B2 * | 11/2005 | Sun et al. | 375/145 |
| 6,967,940 B2 | 11/2005 | Marinier et al. | |
| 2001/0024956 A1 | 9/2001 | You et al. | |
| 2001/0038619 A1 | 11/2001 | Baker et al. | |

(Continued)

FOREIGN PATENT DOCUMENTS

EP  1 122 962  8/2001

(Continued)

OTHER PUBLICATIONS

Chong, "WCDMA Physical Layer (Chapter 6)", www.comlab.hut.fi/opetus/238/lecture6_ch6.pdf, Jan. 2002.

(Continued)

*Primary Examiner*—Joseph Feild
*Assistant Examiner*—Inder Pal Mehra
(74) *Attorney, Agent, or Firm*—Volpe And Koenig, P.C.

(57) ABSTRACT

A wireless communication system having a Node B and a plurality of wireless transmit/receive units (WTRUs), includes a contention-based uplink (UL) channel and at least one downlink (DL) physical channel. The UL channel supports UL transmissions from the WTRUs to the Node B. The UL channel is randomly accessed by a WTRU when the WTRU is ready to transmit data. The DL physical channel supports DL transmissions from the Node B to the WTRUs. The DL transmissions include an acquisition indicator and information regarding said acquisition indicator. The acquisition indicator confirms whether the data transmitted over said UL channel was successfully received by the Node B.

19 Claims, 6 Drawing Sheets

U.S. PATENT DOCUMENTS

| | | | |
|---|---|---|---|
| 2001/0053140 | A1 | 12/2001 | Choi et al. |
| 2002/0089957 | A1 | 7/2002 | Viero |
| 2002/0114294 | A1 | 8/2002 | Toskala et al. |
| 2002/0163956 | A1* | 11/2002 | Seo et al. ................... 375/147 |
| 2004/0008658 | A1* | 1/2004 | Dahlman et al. ............ 370/342 |
| 2004/0047333 | A1* | 3/2004 | Han et al. ................... 370/350 |
| 2005/0180377 | A1* | 8/2005 | Muramoto et al. .......... 370/345 |
| 2006/0203753 | A1* | 9/2006 | Toskala et al. .............. 370/278 |

FOREIGN PATENT DOCUMENTS

WO            01/10158           2/2001

OTHER PUBLICATIONS

Third Generation Partnerhsip Project; Technical Specification Group Radio Access Network; Physical Channels and Mapping of Transport Channels Onto Physical Channels (FDD) (Release 1999), 3GPP TS 25.211 V 3.2.0 (Mar. 2000).

Third Generation Partnerhsip Project; Technical Specification Group Radio Access Network; Physical Channels and Mapping of Transport Channels Onto Physical Channels (FDD) (Release 1999), 3GPP TS 25.211 V 3.11.0 (Jun. 2002).

Third Generation Partnerhsip Project; Technical Specification Group Radio Access Network; Physical Channels and Mapping of Transport Channels Onto Physical Channels (FDD) (Release 1999), 3GPP TS 25.211 V 3.12.0 (Sep. 2002).

Third Generation Partnerhsip Project; Technical Specification Group Radio Access Network; Physical Channels and Mapping of Transport Channels Onto Physical Channels (FDD) (Release 4), 3GPP TS 25.211 V 4.5.0 (Jun. 2002).

Third Generation Partnerhsip Project; Technical Specification Group Radio Access Network; Physical Channels and Mapping of Transport Channels Onto Physical Channels (FDD) (Release 4), 3GPP TS 25.211 V 4.6.0 (Sep. 2002).

Third Generation Partnerhsip Project; Technical Specification Group Radio Access Network; Physical Channels and Mapping of Transport Channels Onto Physical Channels (FDD) (Release 5), 3GPP TS 25.211 V 5.1.0 (Jun. 2002).

Third Generation Partnerhsip Project; Technical Specification Group Radio Access Network; Physical Channels and Mapping of Transport Channels Onto Physical Channels (FDD) (Release 1999), 3GPP TS 25.211 V 5.4.0 (Jun. 2003).

Third Generation Partnership Project; Technical Specification Group Radio Access Network; RRC Protocol Specification (Release 4), 3GPP TS 25.331, V 4.2.1 (Oct. 2001).

Third Generation Partnership Project; Technical Specification Group Radio Access Network; Radio Resource Control (RRC) Protocol Specification (Release 1999), 3GPP TS 25.331, V 3.12.0 (Sep. 2002).

Third Generation Partnership Project; Technical Specification Group Radio Access Network; Radio Resource Control (RRC) Protocol Specification (Release 1999), 3GPP TS 25.331, V 3.15.0 (Jun. 2003).

Third Generation Partnership Project; Technical Specification Group Radio Access Network; Radio Resource Control (RRC) Protocol Specification (Release 4), 3GPP TS 25.331, V 4.7.0 (Sep. 2002).

Third Generation Partnership Project; Technical Specification Group Radio Access Network; Radio Resource Control (RRC) Protocol Specification (Release 4), 3GPP TS 25.331, V 4.10.0 (Jun. 2003).

Third Generation Partnership Project; Technical Specification Group Radio Access Network; Radio Resource Control (RRC) Protocol Specification (Release 5), 3GPP TS 25.331, V 5.1.0 (Jun. 2002).

Third Generation Partnership Project; Technical Specification Group Radio Access Network; Radio Resource Control (RRC) Protocol Specification (Release 5), 3GPP TS 25.331, V 5.5.0 (Jun. 2003).

3G TS 25.211. $3^{rd}$ Generation Partnership Project; Technical Specification Group Radio Access Network; Physical Channels and Mapping of Transport Channels Onto Physical Channels (FDD) (Release 1999), V3.2.0, Mar. 2000.

* cited by examiner

| INFORMATION ELEMENT |
|---|
| PRACH SYSTEM INFORMATION |
| > PRACH INFO |
| > TRANSPORT CHANNEL IDENTITY |
| > RACH TFS |
| > RACH TFCS |
| > PRACH PARTITIONING |
| > PERSISTENCE SCALING FACTORS |
| > AC - TO - ASC MAPPING |
| >>> PRIMARY CPICH TX POWER |
| >>> CONSTANT VALUE |
| >>> PRACH POWER OFFSET |
| >>> RACH TRANSMISSION PARAMETERS |
| >>> AICH INFORMATION |
| >>>> LOCATION |
| >>>> MAPPING |
| >>>> TIMING RELATIONSHIP |

FIG. 5

| INFORMATION ELEMENT |
|---|
| AICH INFORMATION |
| > LOCATION |
| > MAPPING |
| > TIMING RELATIONSHIP |
| |

FIG. 6

METHOD FOR PROVIDING FAST FEEDBACK INFORMATION FOR RANDOM ACCESS CHANNEL IN A WIRELESS COMMUNICATION SYSTEM

CROSS REFERENCE TO RELATED APPLICATION

This application claims priority from U.S. provisional application No. 60/413,952 filed on Sep. 26, 2002, which is incorporated by reference as if fully set forth herein.

FIELD OF INVENTION

This invention relates generally to a method for providing fast feedback information to a wireless transmit/receive unit (WTRU) deployed in a mobile telecommunications system. More specifically, the invention relates to a method for providing fast feedback information for a common channel that is randomly accessed by multiple WTRUs.

BACKGROUND

Current wireless communication systems are typically configured to include a core network, such as a Remote Network Controller (RNC), which is coupled to one or more base stations such as Node Bs, which in turn, are coupled with a plurality of WTRUs.

FIG. 1 shows the mapping of logical channels to the RACH/PRACH in a Third Generation (3G) system in the Time Division Duplex (TDD) mode. It should be understood by those of skill in the art that the mapping scheme in FIG. 1 is not the mapping scheme in TDD, as there are other mapping schemes for mapping channels to DCH/DPCH in TDD. Control information, such as that information transmitted over the common control channel (CCCH) and the dedicated control channel (DCCH) is mapped to the RACH. These logical channels are employed for radio resource control (RRC) connection requests, cell information updates, UTRAN registration area (URA) updates and radio bearer establishment and reconfiguration. In addition, non-real time (NRT) traffic from the dedicated traffic channel (DTCH) and the shared common control channel (SHCCH) are also mapped to the RACH. The RACH is then mapped to the physical channel and becomes the physical RACH (PRACH) channel.

Many current communication systems have uplink common channels (i.e., channels which handle communications transmitted from a WTRU to the Node B) which are accessible by all WTRUs. These channels are used to establish and maintain a wireless connection between the WTRU and the Node B for transmitting both control information and data. The random access channel (RACH) of a 3G system in the TDD mode is such a channel. The RACH is defined as an uplink contention-based common transport channel. When two or more WTRUs attempt to transmit their respective information over the RACH channel at the same time, a contention may occur. To alleviate the contention problem, each WTRU waits a different random amount of time before retransmitting its message to the Node B.

A WTRU having information to transmit over the RACH performs a random back-off process. When a WTRU has a block of data to transmit over the RACH, it performs the random back-off process to access the RACH. More specifically, before the start of a frame, the WTRU randomly generates a number, uniformly distributed between 0 and 1. It then compares the number to a threshold called the dynamic persistence level (DPL), which is also a value between 0 and 1 (for example, 0.5). If the generated random number is less than the DPL, then the WTRU transmits the block of data over the RACH. If the generated random number is greater than the DPL, the WTRU waits until the next frame, at which point it generates a new random number and repeats the process. The WTRU will wait to access the RACH until it has a successful comparison between the random number and the DPL.

In some current systems, the RNC acts as a central controller and controls the rate at which WTRUs access the RACH (and therefore control the duration of the back-off process and the likelihood of collisions) by varying the DPL. The central controller generally has no prior knowledge of which WTRUs, if any, have transmitted over the RACH/PRACH. To make it more difficult for WTRUs to access the RACH, the RNC reduces the dynamic persistence level, for example, from 0.5 to 0.25, making it less probable that the random number generated by the WTRU at a given frame will be smaller than the DPL. By making it more difficult to access the RACH, the probability of there being a collision between multiple WTRUs decreases.

On the other hand, the DPL may be increased (for example, from 0.5 to 0.75) in order to make it easier for WTRUs to access the RACH. By increasing the DPL, it is more probable that the random number generated by the WTRU at a given frame will be smaller than the DPL. This results in a shorter back-off process, but a higher probability of collision between WTRUs.

The RACH is mapped onto the PRACH for transmission. The detection of transmitted PRACH codes is performed at the Node B by midamble detection and code lookup. When PRACH codes are detected, a cyclic redundancy check (CRC) is performed at the Node B to detect errors within the received transmission. A transmission error can result from either a code collision, in which multiple WTRUs transmit using the same PRACH code, or from insufficient transmission power. The PRACH is typically defined as one code within a code in a timeslot. Typically, multiple PRACHs are defined within the same timeslot, or the entire timeslot is reserved for PRACH codes. The Node B monitors the energy level individually for each PRACH (i.e., for each code/timeslot combination that is a PRACH). In this manner, the Node B detects individually, for each PRACH, whether there was an attempt and whether or not it was successful. Therefore, PRACH codes for which successful and failed transmissions occurred are known at the Node B at each frame.

However, there is currently no simple and fast acknowledgment mechanism from the Node B to the WTRU for confirmation of successful or unsuccessful PRACH/RACH attempts. The WTRU must wait for higher layers to process the signal and determine whether or not a transmitted burst was successfully received. When a PRACH transmission fails, the radio link control (RLC) entity, the RRC or some other higher layer entity typically observes the absence of a response for a period of time before the data is retransmitted. In some implementations, a timer specifies the duration before retransmission. The delay incurred for a successful RACH transmission is significantly influenced by the latency incurred in the event of a transmission error. As a result, excessive delays have been observed for the successful transmission of data due to retransmissions.

It would be desirable to have a fast feedback mechanism for notifying WTRUs of the success or failure of a transmission using PRACH/RACH codes. Such a feedback mechanism should be extremely fast, have backwards compatibility and have a low complexity.

SUMMARY

The present invention is a system that provides a fast feedback mechanism for notifying WTRUs of the success or failure of a transmission over a contention-based channel. The system significantly reduces the delay in obtaining a contention-based channel access, and as a result, reduces WTRU battery consumption since the WTRU does not have to monitor an access channel for an extended amount of time after a transmission.

BRIEF DESCRIPTION OF THE DRAWING(S)

FIGS. 5 and 6 are information elements in accordance with the present invention.

DETAILED DESCRIPTION OF THE PREFERRED EMBODIMENT(S)

Figure 1:
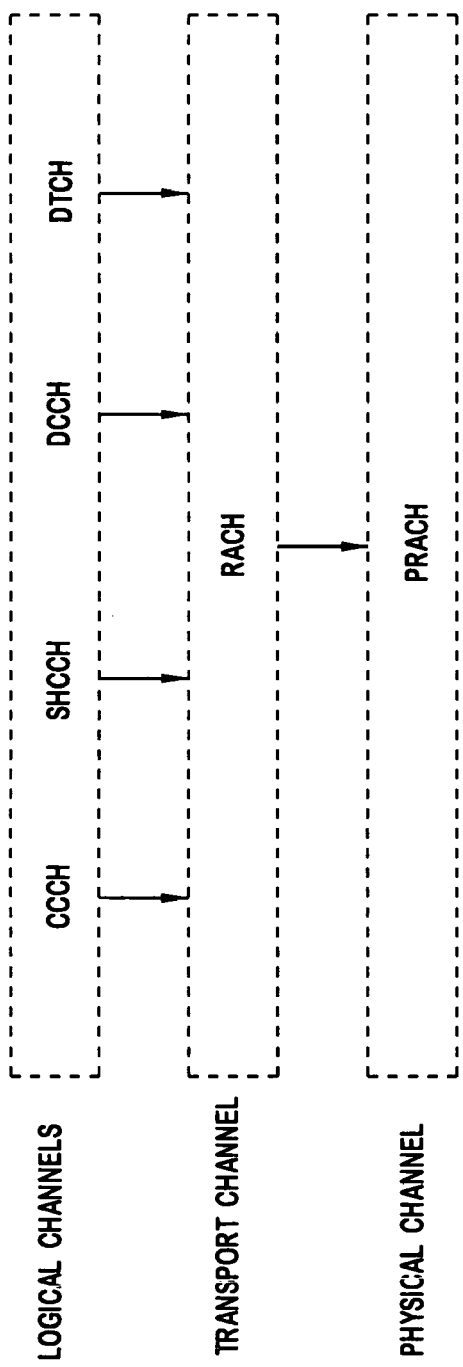
FIG. 1 is a representation of prior art logical mapping for transmission over RACH/PRACH.

The present invention will be described with reference to the drawing figures wherein like numerals represent like elements throughout.

The present invention provides a fast feedback mechanism for the success or failure of a transmission over a contention-based channel. It should be noted that in the subsequent description of the invention, specific references are made to an acknowledgment mechanism as it applies to the TDD mode of a 3G system. However, this is for illustrative purposes only and should not be viewed by way of limitation, as the present invention is applicable to other time-slotted and wireless communication systems as well.

The present invention proposes three alternative embodiments of feedback mechanisms by which the PRACH code or timeslot reception information can be conveyed to WTRUs. The first embodiment introduces a new downlink physical signal to provide feedback information to the WTRUs from the Node B.

Figure 2:
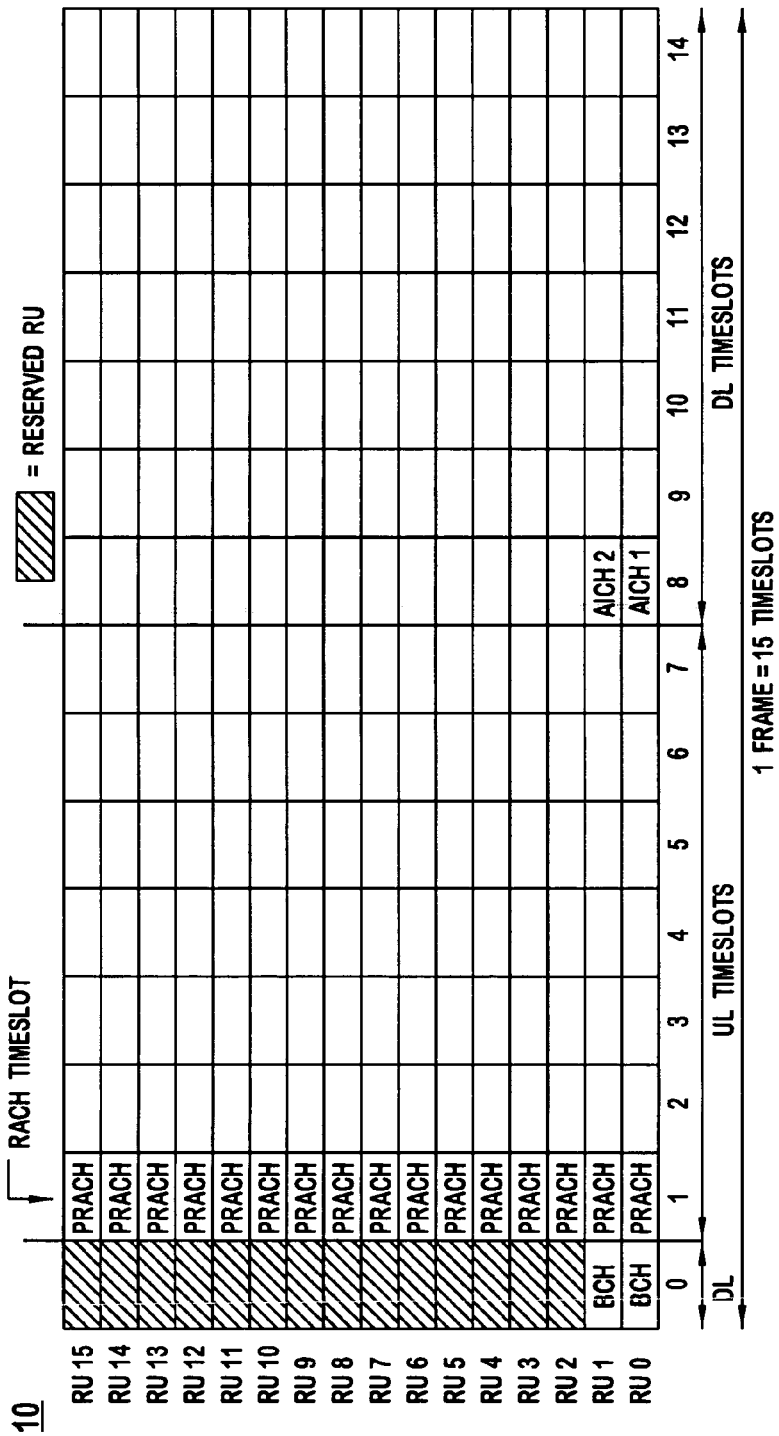
FIG. 2 is an example of a TDD frame configured in accordance with the present invention.

Referring to FIG. 2, a TDD frame 10 configured in accordance with the present invention is shown. It should be noted that the specific configuration of the frame may be modified without departing from the scope of the present invention. The present invention introduces an acquisition indicator channel (AICH) which proves a fast feedback mechanism. The TDD frame 10 has fifteen timeslots (TSs), (numbered 0-14 on the horizontal axis), and 16 resource units (RUs), designated RU0-RU15 per timeslot shown on the vertical axis. TS 0 and TSs 8-14 are downlink (DL) timeslots and TSs 1-7 are uplink (UL) timeslots. It should be noted that FIG. 2 is an example configuration. Those of skill in the art would realize that there are other possible configurations that could be pursued without departing from the scope of the present invention.

TS 0 is reserved for the Broadcast Channel (BCH) which carries the system information blocks (SIB). SIBs are broadcast throughout a cell over a BCH in order to provide WTRUs with basic system information (e.g., when a WTRU is turned on, it accesses system information on the BCH in order to initiate communication with the network). In the TDD mode of a 3G system, SIBs 5 and 6 contain the entire configuration for the common channels, both uplink and downlink, including information regarding which codes in which timeslots are dedicated for the PRACH. RU0 and RU1 are used to transmit the BCH, whereas all other RUs of TS 0 are reserved. Accordingly, TS 0 is used exclusively for the BCH.

One timeslot is dedicated to the PRACH, in which a maximum of 16 different codes will be available. As shown in FIG. 2, all RUs of TS 1 are used for UL PRACH transmissions.

In TS 8, RUs 0 and 1 are used to transmit the acquisition indicator channel (AICH). All other RUs in the remaining UL and DL timeslots are used for dedicated channels (DPCHs).

As shown in FIG. 2, each AICH comprises a single channelization code in a single timeslot. Although in the present example, the AICH is a single code (i.e., a single RU), there could be two or more RUs used. Alternatively, in the example shown in FIG. 2, there are two AICHs (e.g., AICH1 and AICH 2). Each AICH comprises a single RU.

As will be explained in greater detail hereinafter, for example, the first AICH may convey information for the first eight PRACHs in TS1 whereas the second AICH may convey information for the last eight PRACHs.

Table 1 below illustrates the mapping between transport channels and physical channels. Since the AICH is a physical signal it has no transport channel mapped to it. The AICH is not visible to higher network layers since it is managed directly by the physical layer in the Node-B.

TABLE 1

| Transport Channels | Physical Channels |
|---|---|
| DCH | Dedicated Physical Channel (DPCH) |
| BCH | Primary Common Control Physical Channel (P-CCPCH) |
| FACH | Secondary Common Control Physical Channel (S-CCPCH) |
| PCH | |
| RACH | Physical Random Access Channel (PRACH) |
| USCH | Physical Uplink Shared Channel (PUSCH) |
| DSCH | Physical Downlink Shared Channel (PDSCH) |
| | Paging Indicator Channel (PICH) |
| | Synchronisation Channel (SCH) |
| | Physical Node B Synchronisation Channel (PNBSCH) |
| | Acquisition Indicator Channel (AICH) |

As will be explained in detail, in accordance with the present invention, the AICH is used to acknowledge the safe receipt of a UL RACH transmission in a fast manner.

Figure 3A:
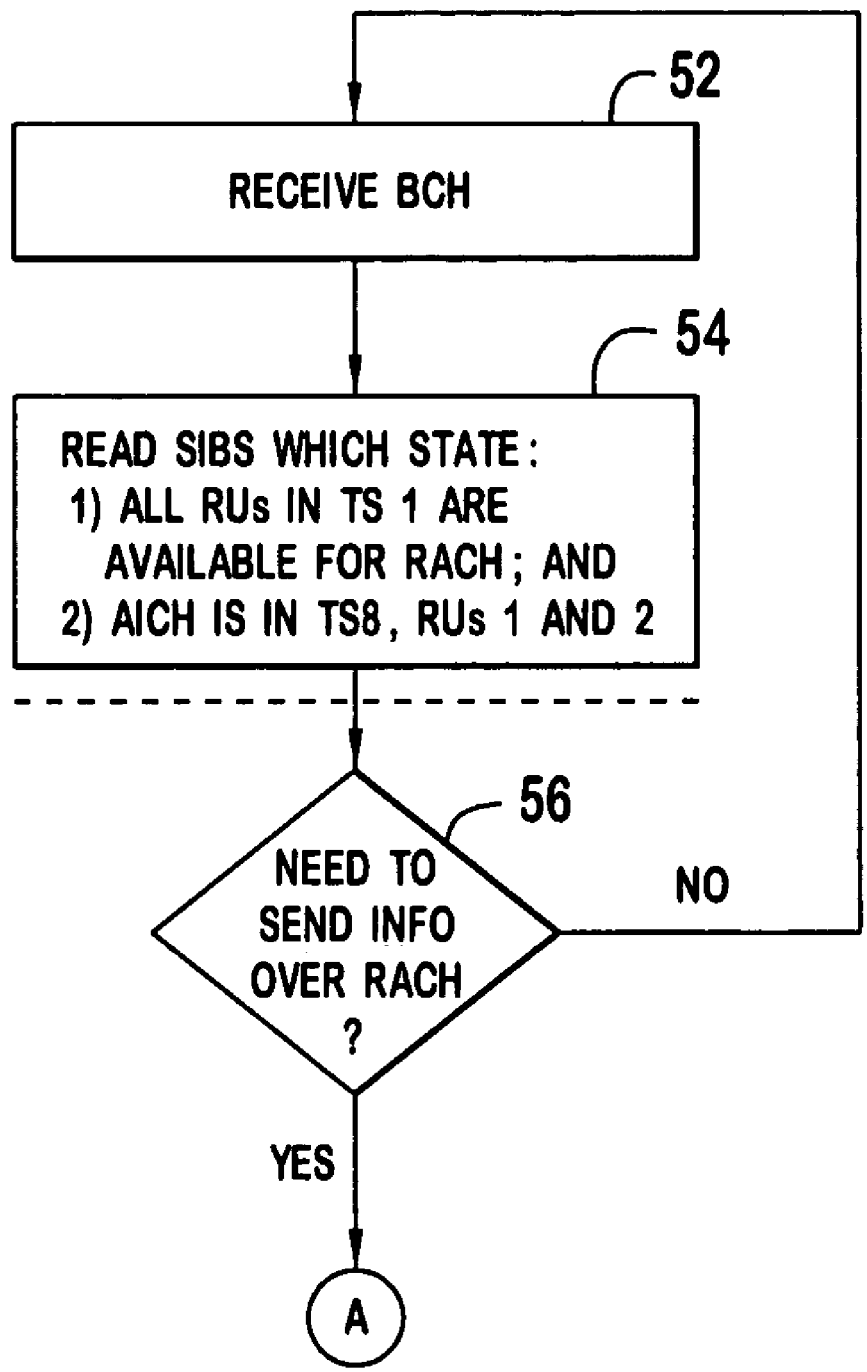
FIGS. 3A and 3B are a flow diagram of a method for providing fast feedback in accordance with the present invention.
Figure 3B:
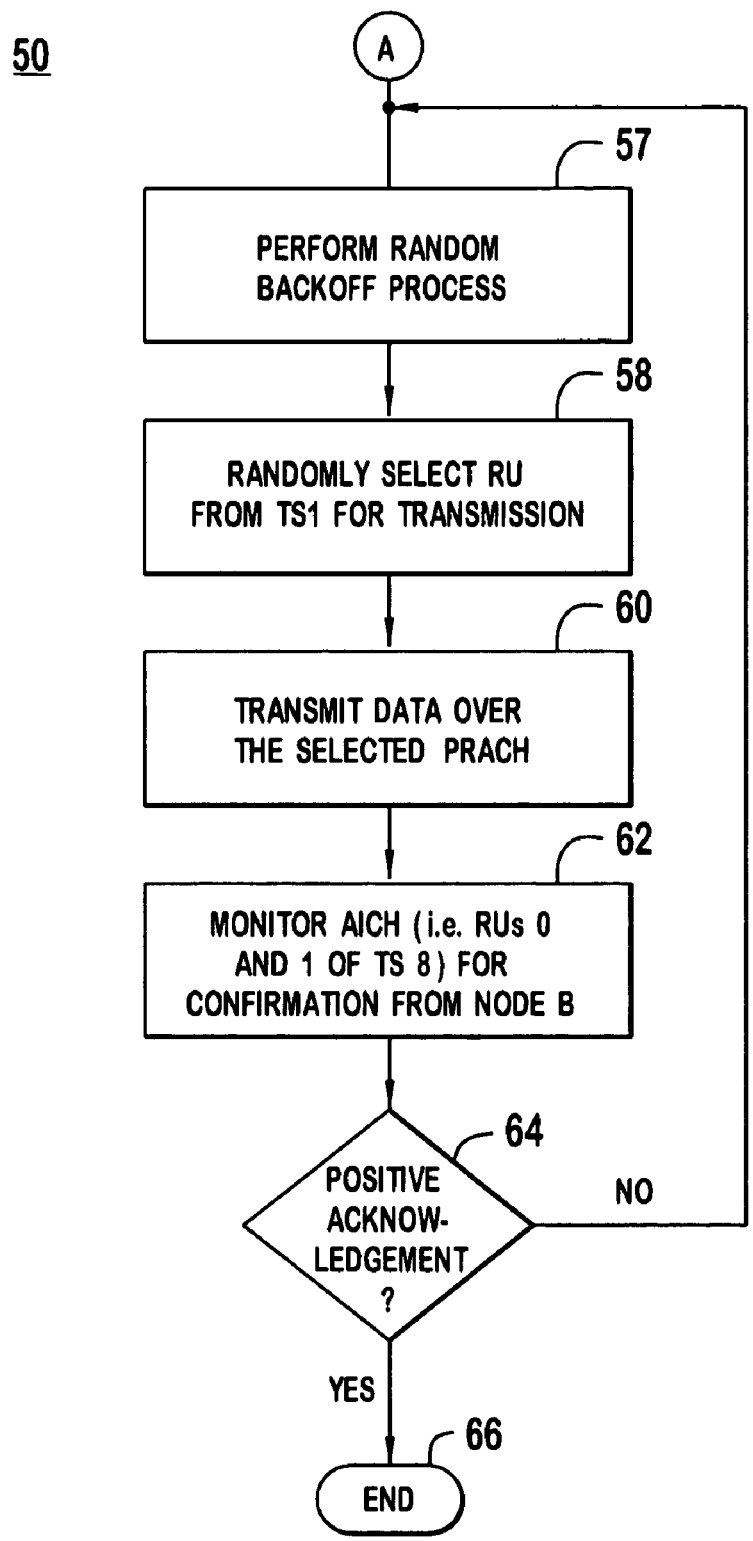

Referring to FIGS. 3A and 3B, a procedure 50 for providing fast feedback information for a randomly accessed channel in accordance with the present invention is shown. It should be noted that the first three steps (steps 52-56 shown in FIG. 3A which are directed to reading of the BCH) are independent of whether or not the WTRU has data to send over the PRACH. The WTRU will always read the BCH when energized. Thereafter, it will periodically read certain parts of the BCH at differing intervals (certain SIBs, such as those carrying rapidly changing system information like the DPL). Accordingly, although steps 52-56 have been included in the present procedure 50 and shown and described as being performed periodically, it is not necessary to periodically perform all of these steps. They have been included with reference to the present invention for clarity. When the WTRU has data to send, it simply uses the most recently acquired system information from the BCH.

The procedure 50 begins by the WTRU receiving the BCH (step 52). The WTRU reads the system information blocks (SIBs) within the BCH (step 54). It should be noted that although the TSs RUs referred to hereinafter are with reference to the example transmission frame shown in FIG. 2, this assignment is arbitrary and will depend upon the actual implementation of the system. In general, the SIBs will set forth the TSs and RUs which are available for all of the channels; in particular the PRACH and the AICH. For the example shown in FIG. 2, the SIBs state: 1) all RUs in TS 1 are available for the RACH; and 2) the AICH is in TS 8, RUs 1 and 2.

If the WTRU does not need to send information over the RACH as determined as step 56, it returns to step 52 to repeat the process again.

If the WTRU needs to send information over the RACH as determined at step 56, it first implements the aforementioned back-off procedure (step 57). Once the back-off procedure has successfully completed (i.e., a random number was generated that was less than the DPL), the WTRU randomly selects an RU from TS1 for transmission. The WTRU transmits data over the PRACH using only a single code, As understood by those of skill in the art, a PRACH code can have either spreading factor (SF)=16 (i.e., one RU) or SF=8 (i.e., two RUs). For example, in FIG. 2, all PRACHs are SF16. The data is then transmitted over the selected PRACH (step 60) and the WTRU monitors the AICH(s), which in the present example comprise RUs 0 and 1 of TS 8, for a positive acknowledgement from the Node B (step 62).

If the AICH indicates that nothing was received on a given PRACH or that an error was received, the WTRU knows immediately that it has to retransmit the data. If there is no positive acknowledgment, the WTRU returns to step 57 to restart the back-off process for the data to be retransmitted. If a confirmation from the Node B has been received over the AICH as determined at step 64, the transmission was successfully received and the procedure 50 is terminated (step 66).

Although FIGS. 3A and 3B illustrate the procedure 50 for a single WTRU, it should be understood that for a contention-based channel, multiple WTRUs will be accessing the channel. Accordingly, there are several possible scenarios for each PRACH code: 1) a single WTRU has selected a particular code and the transmission is successful; 2) a single WTRU has selected a particular code and the transmission has failed due to a bad channel; 3) multiple WTRUs have selected a particular code for transmission and their transmissions have all failed due to a contention; and 4) no WTRU has selected a particular code and thus, no transmission was received.

Depending upon the configuration desired by the system operator, the Node B can provide WTRUs with the following feedback information over the AICH:

1) Only the codes for which a successful transmission was received.
2) Only the codes for which a failed transmission was received.
3) For each code, whether a successful transmission was received, a failed transmission was received or nothing was received. In addition, if the Node B is equipped with an algorithm that can determine the cause of a PRACH error, such as a PRACH code collision or insufficient transmission power, then the feedback may include the cause of the transmission error, although this is not required. A system having such a capability is described in U.S. patent application Ser. No. 10/329,308 entitled DYNAMIC FORWARD ERROR CORRECTION IN UTRA SYSTEMS which is incorporated by reference as if fully set forth herein.

There are also several alternatives regarding how many PRACHs each transmission of the AICH confirms. In a first alternative, each AICH provides feedback information for a predetermined number of PRACH codes. In the simplest case, assuming there are N PRACH codes in one frame, a single AICH per frame provides feedback for all N PRACH codes in the frame. In a second alternative, a single AICH could provide feedback information for all N PRACH codes over multiple frames, in which case the AICH would not be transmitted every frame. In a third alternative, multiple AICHs would provide feedback information for all N PRACHs in a single frame, in which case multiple AICHs would be transmitted every frame.

In order to allow for processing delays by the Node B and the WTRU, a minimum number of timeslots should separate the AICH from the latest PRACH code for which feedback is reported. The minimum number of timeslots, typically in the range of one to five, should be chosen such that processing delays at the Node B and processing delays at the WTRU are considered. For the example shown in FIG. 2, there is a seven timeslot delay (i.e., between TS1 and TS8) because the AICHs acknowledge the PRACH codes of the same frame. Alternatively, it is possible that the AICHs of a frame acknowledge the PRACH of a previous frame.

Since RACH/PRACH configuration is described in SIBs 5 and 6 of the BCH, preferably the AICH channel configuration as well as the PRACH-to-AICH mapping is also broadcast in SIBs 5 and 6. More specifically, SIBs 5 and 6 should preferably also describe the following for each AICH (if multiple AICHs exist): 1) the location of the AICH (i.e., the code and timeslot associated with the AICH); 2) the PRACH-to-AICH mapping (i.e., which PRACH codes are acknowledged by which AICH(s); and 3) the timing relationship between PRACH codes and the AICH (i.e., describing whether an AICH in frame N provides feedback for the PRACHs in frame N or for PRACHs in frames N–1, N–2 . . . (previous frames)).

The code and timeslot associated with the AICH was explained hereinabove. With respect to the mapping of codes to the AICH and the timing relationship, for example, in FIG. 2, AICH 1 (code 0 in TS 8) acknowledges PRACHs 0 through 7 of TS1 of the same frame, whereas AICH 2 (code 1 in TS8) acknowledges PRACHs 8 through 15 of the same frame. In another example, AICH 1 (code 0 in TS 8) acknowledges PRACHs 0 through 7 of TS1 of the previous frame, whereas AICH 2 (code 1 in TS8) acknowledges PRACHs 8 through 15 of the previous frame.

An example of the extension and/or the modification of SIBs 5 and 6 to provide the 1) location of the AICH; 2) the PRACH-to-AICH mapping; and 3) the timing relationship between the PRACH codes and the AICH(s) will now be described. SIBs are divided into a plurality of information elements (IEs). All of the information regarding a particular PRACH is described within one IE. An example of an information element is shown in FIG. 5. As shown, the associated AICH channel information including its location, mapping and timing is specified. Alternatively, as shown in FIG. 6, a separate IE could be created within SIBs 5 and 6 describing the AICH channel information.

As for the mapping between individual PRACH codes and acknowledgement indicators within an AICH (bits or symbols), a predefined mapping rule is preferably implemented. In one embodiment, for example, the mapping rule associates the first code of the first PRACH code served by the AICH with the first acknowledgement-indicator, the second code of the first PRACH with the second acknowledgement-indicator, and so on. In this way, each AICH indicator is sequentially mapped to a PRACH code. For example, if one AICH serves all 16 PRACH codes in a frame, then AICH indicator 1 provides feedback for the first PRACH code, AICH indicator 2 provides feedback for the second PRACH code, . . . AICH indicator 16 provides feedback for the 16$^{th}$ PRACH code. Alternatively, a non-sequential mapping rule could be defined.

The AICH is a physical signal. If the AICH is utilized in a 3G system, it is preferably transmitted using either burst type 1 or burst type 2. As should be understood by those of skill in the art, there are three different types of physical layer burst defined in the TDD mode of a 3G system. All three types differ by the number of chips that are reserved for midamble and guard period. However, since burst type 3 is used for UL transmissions will most likely not be utilized for the AICH in accordance with the present invention.

Figure 4:
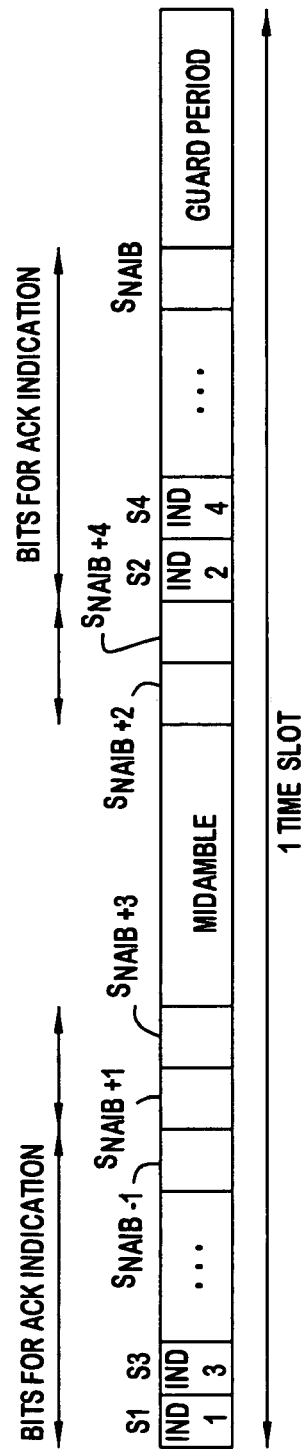
FIG. 4 is in an AICH burst in accordance with the present invention.

An example of an AICH burst for the TDD mode is shown in FIG. 4, where a positive indicator provides positive feedback for a particular PRACH code. In the example of FIG. 4, $N_{AIB}$ bits in a normal burst of type 1 or 2 are used to carry the acknowledgement indicators, where $N_{AIB}$ depends on the burst type (i.e., $N_{AIB}=240$ indicates burst type 1 and $N_{AIB}=272$ indicates burst type 2). The bits $S_{NAIB}+1$ through $S_{NAIB}+4$ are adjacent to the midamble and are reserved for possible future use.

Each acknowledgement indicator in one time slot is mapped to the bits $\{s_{Lai*q+1}, \ldots, s_{Lai*(q+1)}\}$ within this time slot; where Lai is the length of the acknowledgment indicator in number of bits. Since transmissions are interleaved, as shown in FIG. 4, the bits for half of each acknowledgment indicator are transmitted in the first data part, and the other half of the symbols are transmitted in the second data part. For example, if four bits are required to provide feedback information for a particular PRACH code (whether or not it includes forward error correction), then two of the four bits would be transmitted in the first part, whereas the remaining two bits would be transmitted in the second part. By doing so, the burst is made more robust towards bursty channel errors (i.e., if many bits in the first half have errors, the information can be reconstructed from the information in the second half).

In order to make transmissions more robust against channel errors, bits may also be transmitted several times. Since channel errors are often bursty (i.e., multiple consecutive bits are affected), redundant bits are distributed in time (time diversity), or interleaved. For example, suppose that the same acknowledgement indicator is transmitted twice. In FIG. 4, the first bit would be sent in the first half (left of the midamble), whereas the redundant bit would be sent in the second half (right of the midamble). If there is an error in the first half of the timeslot, then at least the second redundant bit can be successfully received.

Different radio resource management (RRM) strategies are possible to maximize the efficiency of the AICH while reducing its disturbance to the overall system. For example, QPSK symbols may be directly mapped to AICH indicators. In this case, it is possible to transmit zero amplitude signals for negative indicators rather than transmitting full amplitude QPSK symbols. Such an approach would reduce the interference generated by introduction of the AICH. QPSK signals consist of transmitting either a 1 or −1 on an in-phase carrier (I) or a quadrature-phase carrier (Q), resulting in four different possible symbols (1,1; 1,−1; −1,−1; −1,−1). To generate less interference, negative indicators may be transmitted with zero amplitude rather +/−1.

Figure 7:
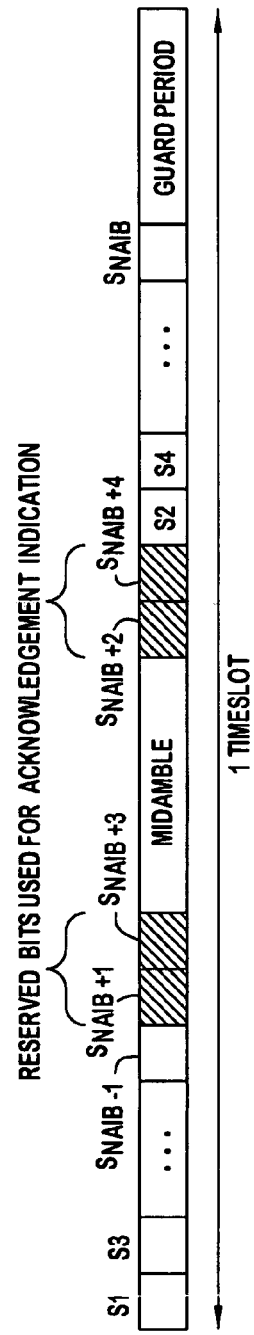
FIG. 7 is a PICH burst in accordance with the present invention.

A second embodiment of a feedback mechanism in accordance with the present invention utilizes existing physical channels/signals, such as the paging indicator channel (PICH). The PICH burst structure is shown in FIG. 7. In this embodiment, the reserved bits of the PICH burst structure (shown as cross-hatched) are used to convey the feedback information. As shown, AICH bits could be placed on either side of the midamble, in the bits that are currently reserved.

It should be also understood that feedback information may be conveyed in other different ways, which include modification of the basic burst structure in order to include additional symbols bearing feedback information, and signaling of feedback information via a midamble shift.

A third embodiment of a feedback mechanism in accordance with the present invention utilizes RRC layer broadcast information to convey feedback to the WTRUs. Some system information that is transmitted over certain SIBs is dynamic, and other information transmitted over the SIBs is static (or semi-static). For example, common channel configuration information (e.g., the PRACH) typically changes approximately once per day and hence, the contents of SIBs 5 and 6 are rarely updated. In contrast, Node B UL interference measurements, which are broadcast throughout the cell for UL power control, change as often as several times each second. SIBs 7 and 14 are examples of such SIBs which are generally updated often as they contain "dynamic" information. In this embodiment, the AICH information is sent directly in SIBs 7 or 14 via an IE, such as shown in FIG. 5. In contrast to the preferred embodiment where the AICH channel information (i.e., location, mapping and timing) is described in SIB 5 and SIB 6 and the acknowledgement indication is sent over the AICH in this embodiment, the acknowledgement indication is sent directly in an SIB such as SIB7 or 14. It should be noted that the AICH channel information (i.e., the particular SIB is used to convey the feedback), must still be broadcast in SIBs 5 or 6.

Alternatively, in addition to the 18 existing TDD SIBs, a 19$^{th}$ SIB could be defined. As understood by those of skill in the art, the contents of the SIBs are filled by the RRC Layer (L3). SIBS are then placed in the BCH (at L3), delivered to the MAC-C (L2), which then delivers them to L1 where the BCH is mapped to the P-CCPCH. This approach of defining a 19$^{th}$ involves L1, L2 and L3 rather than strictly being a physical layer procedure.

It should be noted that in any of the aforementioned embodiments, AICH channel information or AICH acknowledgements may be transmitted by: 1) modifying an existing IE; 2) creating a new IE within an existing SIB; or 3) by creating a new SIB. Preferably, the maximum transmission attempts shall be up to a maximum number (Nmax) of retransmissions from a particular WTRU. Nmax is a parameter chosen by the system operator typically in the range of one to five. For example, if a WTRU is located outside of cell range and attempts to transmit data over PRACH, it will likely fail. If it simply continuously tries to resend the data over PRACH while failing every time, it will waste PRACH capacity. As such, there should be maximum number of retransmissions after which point the WTRU aborts. The maximum number of retransmissions, Nmax, is preferably signaled in SIBs 5 or SIB 6 along with the AICH channel information.

The upper layers could be notified of the successful transmission of TBSs for which the WTRU receives or infers a positive acknowledgment.

Figure 8:
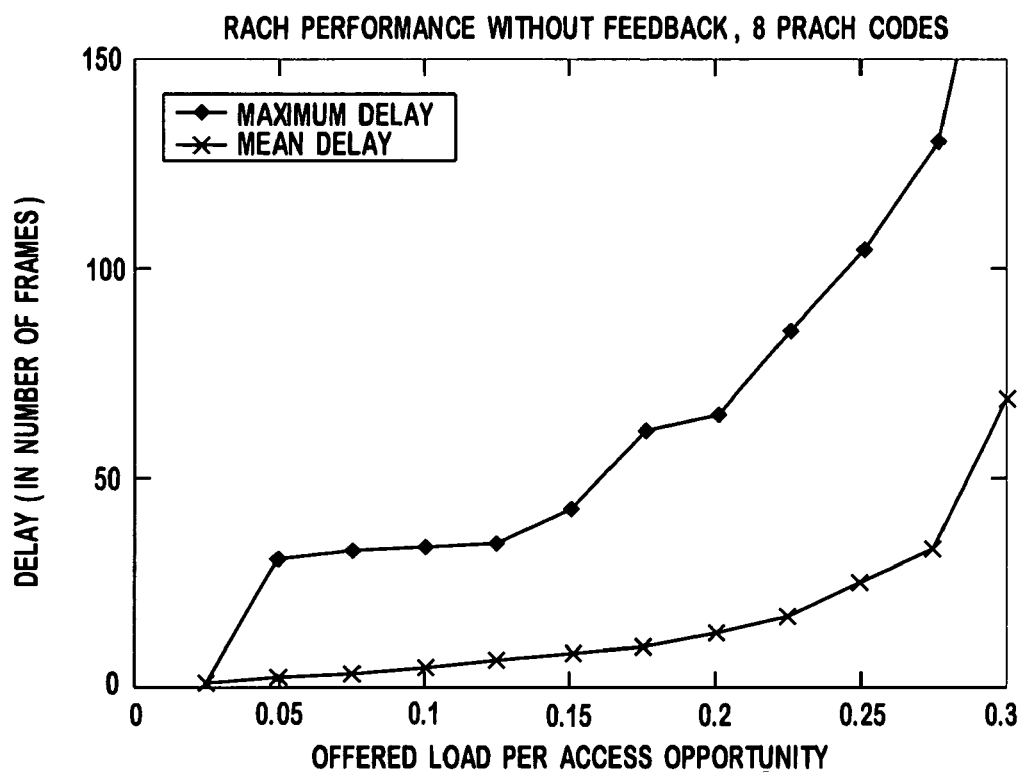
FIG. 8 is a graph of the mean delay and maximum delay for a successful RACH transmission as a function of the offered load per PRACH access opportunity for a TDD system without the present invention.
Figure 9:
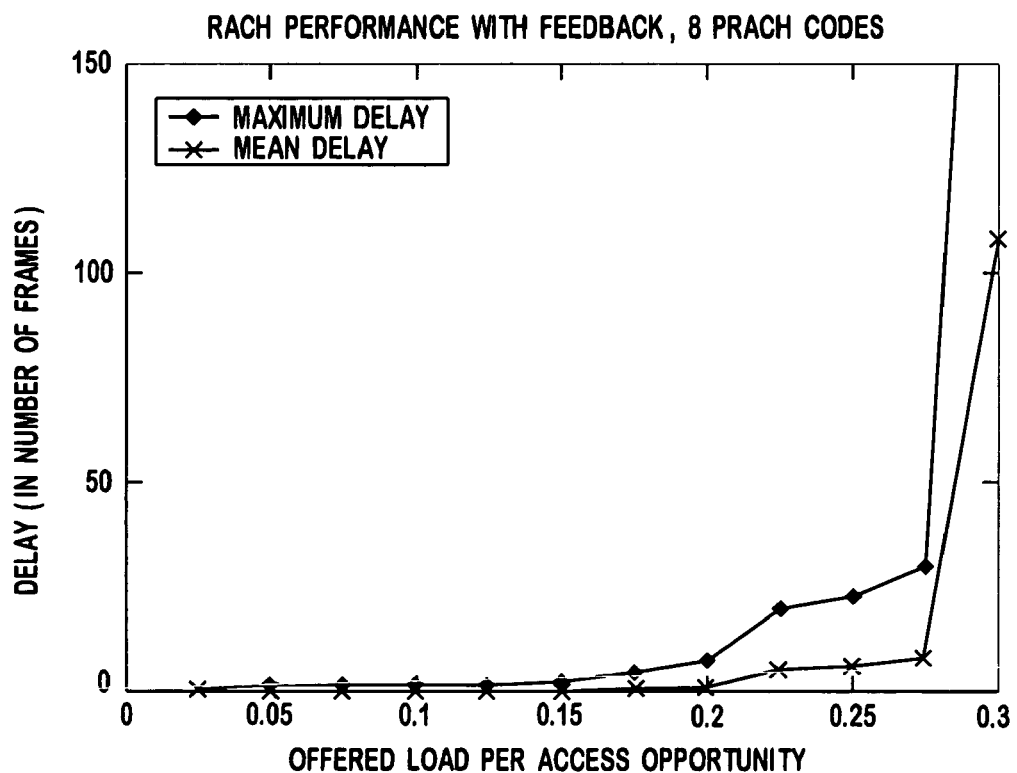
FIG. 9 is a graph of the mean delay and maximum delay for a successful RACH transmission as a function of the offered load per PRACH access opportunity for a TDD system with a fast feedback mechanism in accordance with the present invention.

The mean delay and maximum delay for a successful PRACH transmission are illustrated in FIG. 8 as a function of the offered load per PRACH access opportunity, for a TDD system without fast feedback. A thirty frame delay is incurred in the case of a transmission error, assuming transmission in RLC AM. Specifically, this delay corresponds to the time between which the transmitter RLC receives an acknowledgment of transmission from lower layers to the time a decision is taken to retransmit a PDU. In contrast, the mean delay and maximum delay for a successful PRACH transmission are illustrated in FIG. 9 as a function of the offered load per RACH access opportunity, for a TDD system with a fast feedback mechanism in accordance with the present invention. It is assumed that feedback information is conveyed to WTRUs on the following frame.

Although the present invention has been described in detail, it is to be understood that the invention is not limited thereto, and that various changes can be made therein without departing from the scope of the invention, which is defined by the attached claims.

What is claimed is:

1. A method for acknowledgment of transmissions in wireless communications comprising:
    accessing an uplink (UL) channel, the UL channel including at least two codes for transmission;
    receiving an acquisition indicator transmitted on a downlink (DL) channel; and
    confirming, with said acquisition indicator, separately for each of said codes, whether the data transmitted over said UL channel was successfully received.

2. The method of claim 1 comprising receiving information regarding the acquisition indicator on the DL channel, the information includinig a timeslot occupied by said acquisition indicator.

3. The method of claim 2 wherein said information regarding said acquisition indicator includes a code used to transmit said acquisition indicator.

4. The method of claim 2 wherein said information regarding said acquisition indicator includes a mapping between each said code and a corresponding acquisition indicator.

5. The method of claim 2 wherein said information regarding said acquisition indicator is received in a broadcast channel.

6. The method of claim 1 comprising receiving at least one acquisition indicator for each code.

7. The method of claim 1 wherein said acquisition indicator is received in a dedicated physical channel.

8. The method of claim 1 wherein said acquisition indicator is received in a broadcast channel.

9. The method of claim 1 wherein said acquisition indicator is received in a paging indicator channel.

10. A wireless transmit/receive unit (WTRU) comprising:
    a transmitter configured to transmit uplink (UL) transmissions on an UL channel, the uplink channel comprising at least two codes for transmission;
    a receiver configured to receive downlink (DL) transmissions in at least one DL physical channel, the downlink transmissions including an acquisition indicator configured for separately confirming for each code whether data transmitted over the UL channel was successfully received.

11. The WTRU of claim 10 configured to receive transmissions which include information about the acquisition indicator.

12. The WTRU of claim 11 configured to receive said information comprising a timeslot occupied by said acquisition indicator.

13. The WTRU of claim 11 configured to receive said information comprising a code used to transmit the acquisition indicator.

14. The WTRU of claim 11, configured to receive said information comprising a mapping between each code and the corresponding acquisition indicator.

15. The WTRU of claim 11, wherein the receiver is configured for receiving said information in a broadcast channel of a Time Division Duplex system.

16. The WTRU of claim 10, configured to receive at least one acquisition indicator for each code.

17. The WTRU of claim 10, wherein the receiver is configured for receiving said acquisition indicator in a dedicated physical channel of a Time Division Duplex system.

18. The WTRU of claim 10, wherein the receiver is configured for receiving said acquisition indicator in a broadcast channel of a Time Division Duplex system.

19. The WTRU of claim 10, wherein the receiver is configured for receiving said acquisition indicator in a paging indicator channel of a Time Division Duplex system.

* * * * *

UNITED STATES PATENT AND TRADEMARK OFFICE
CERTIFICATE OF CORRECTION

PATENT NO. : 7,406,044 B2
APPLICATION NO. : 10/672179
DATED : July 29, 2008
INVENTOR(S) : Cave et al.

It is certified that error appears in the above-identified patent and that said Letters Patent is hereby corrected as shown below:

IN THE SPECIFICATION

At column 3, line 21, before the words "an AICH", delete "in".

At column 3, line 63, after the word "which", delete "proves" and insert therefor --provides--.

At column 5, line 12, before the word "referred", delete "TSs RUs" and insert therefor --TS's RUs--.

At column 5, line 27, before the word "successfully", insert --been--.

At column 5, line 30, after the word "code", delete "," and insert therefor --.--.

At column 7, line 19, after the word "layer", delete "burst" and insert therefor --bursts--.

At column 8, line 3, after the word "symbols", delete "(1,1; $\tilde{1},\tilde{1}$; $\tilde{1},\tilde{1};\tilde{1},1$)." and insert therefor --(1,1; $\tilde{1},\tilde{1}$; 1, $\tilde{1};\tilde{1},1$).--.

At column 8, line 49, after the words "a 19th", insert --SIB--.

At column 8, line 64, before the word "maximum", insert --a--.

UNITED STATES PATENT AND TRADEMARK OFFICE
CERTIFICATE OF CORRECTION

PATENT NO. : 7,406,044 B2
APPLICATION NO. : 10/672179
DATED : July 29, 2008
INVENTOR(S) : Cave et al.

It is certified that error appears in the above-identified patent and that said Letters Patent is hereby corrected as shown below:

IN THE CLAIMS

At claim 2, column 9, line 36, after the word "information", delete "includinig" and insert therefor --including--.

Signed and Sealed this

Thirteenth Day of January, 2009

JON W. DUDAS
*Director of the United States Patent and Trademark Office*